US011934912B2

(12) United States Patent
Barkan et al.

(10) Patent No.: US 11,934,912 B2
(45) Date of Patent: Mar. 19, 2024

(54) BIOPTIC BARCODE READER

(71) Applicant: ZEBRA TECHNOLOGIES CORPORATION, Lincolnshire, IL (US)

(72) Inventors: Edward Barkan, Miller Place, NY (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 44 days.

(21) Appl. No.: 17/872,920

(22) Filed: Jul. 25, 2022

(65) Prior Publication Data

US 2024/0028846 A1    Jan. 25, 2024

(51) Int. Cl.
  *G06K 7/10*    (2006.01)
  *G06K 7/14*    (2006.01)
(52) U.S. Cl.
  CPC ..... *G06K 7/10564* (2013.01); *G06K 7/10831* (2013.01); *G06K 7/1413* (2013.01)
(58) Field of Classification Search
  CPC ............. G06K 7/1096; G06K 7/10732; G06K 7/10574; G06K 7/10564; G06K 7/1413; G06K 7/10712; G06K 7/10831
  USPC .................. 235/462.14, 462.36, 462.43, 454
  See application file for complete search history.

(56) References Cited

U.S. PATENT DOCUMENTS

| | | | | |
|---|---|---|---|---|
| 11,210,481 B1* | 12/2021 | Drzymala | .......... | G06K 7/10574 |
| 11,334,734 B1* | 5/2022 | Barkan | ................ | G06K 7/1491 |
| 2006/0022051 A1* | 2/2006 | Patel | .................. | G06K 7/10732 |
| | | | | 235/462.14 |
| 2008/0135619 A1* | 6/2008 | Kwan | ................ | G06K 7/10722 |
| | | | | 235/462.39 |
| 2014/0252094 A1* | 9/2014 | Wright | ................ | G06K 7/1096 |
| | | | | 235/440 |
| 2016/0210492 A1* | 7/2016 | Trajkovic | ............. | A61N 1/0558 |
| 2021/0012072 A1* | 1/2021 | Jaffri | .................. | G06K 7/10356 |

* cited by examiner

*Primary Examiner* — Daniel St Cyr
(74) *Attorney, Agent, or Firm* — Yuri Astvatsaturov (57) ABSTRACT

An example bioptic barcode reader includes an imaging assembly, first illumination assembly, and second illumination assembly. No more than 10% of a light source of the second illumination assembly is visible within a boundary of a first imaging FOV of the imaging assembly. No more than 10% of a first mirror is visible within a boundary of a second imaging FOV of the imaging assembly. An upper edge of an aperture in an upper housing portion is outside a boundary of a first illumination FOV of the first illumination assembly. All or substantially all light rays from the second illumination assembly that pass through a horizontal window in a lower housing portion form respective angles relative to horizontal that are equal to or less than a second angle formed between a normal line of the first mirror and horizontal.

20 Claims, 9 Drawing Sheets

BIOPTIC BARCODE READER

BACKGROUND

In typical bioptic barcode readers, the imaging fields-of-view through the horizontal and upright windows need to be exposed separately due to the fact that illumination from the opposite illumination system would create artifacts or hotspots in the image sensor that would diminish the decode performance, which can degrade swipe performance. When an object is swiped through the field-of-view of a bioptic barcode reader, it is only in the fields-of-view for a very short time period, during which only a handful of images frames can be captured from each window, depending on the frames per second. Having to alternate the illumination, and therefore the image capture, between the horizontal and upright windows effectively cuts in half the number of image frames captured during a swipe event. Therefore, there is a need for a bioptic barcode scanner that can simultaneously expose and illuminate the imaging fields-of-view passing through both the upright and horizontal windows of the bioptic barcode reader without having to alternate the imaging and illumination through the horizontal and upright windows.

SUMMARY

In an embodiment, the present invention is a bioptic barcode reader comprising a housing having a lower housing portion with an upper surface facing a product scanning region and an upper housing portion extending above the lower housing portion. A generally horizontal window is positioned at the upper surface of the lower housing portion and a generally upright window is positioned in an aperture in the upper housing portion. An imaging assembly is positioned within the housing and has a first imaging field-of-view (FOV) that is directed toward the horizontal widow and a second imaging FOV that is directed towards the upright window. A first mirror is positioned within the housing and configured to reflect the first imaging FOV towards the horizontal window. A first illumination assembly has a first illumination FOV that is directed towards the horizontal window and a second illumination assembly has a second illumination FOV that is directed towards the upright window. No more than 10 percent of a light source of the second illumination assembly is visible within a boundary of the first imaging FOV, no more than 10 percent of the first mirror is visible within a boundary of the second imaging FOV, an upper edge of the aperture in the upper housing portion is outside a boundary of the first illumination FOV, and all or substantially all light rays from the second illumination assembly that pass through the horizontal window, and are not reflected within the horizontal window or off of an object, form respective angles relative to horizontal that are equal to or less than a second angle formed between a normal line of the first mirror and horizontal.

In a variation of this embodiment, the imaging assembly includes an image sensor having a sensor FOV. A second mirror is positioned within the housing and is configured to redirect the second imaging FOV towards the upright window. A splitter mirror is positioned with the housing and is configured to split the sensor FOV into the first imaging FOV and second imaging FOV and redirect the second imaging FOV towards the second mirror.

In another variation of this embodiment the imaging assembly comprises a first image sensor including the first imaging FOV and a second image sensor including the second imaging FOV. The first mirror is configured to redirect the first imaging FOV towards the horizontal window and the bioptic barcode reader comprises a second mirror positioned within the housing and configured to redirect the second imaging FOV towards the upright window.

In another embodiment, the present invention is a bioptic barcode reader comprising a housing having a lower housing portion with an upper surface facing a product scanning region and an upper housing portion extending above the lower housing portion. A generally horizontal window is positioned at the upper surface of the lower housing portion and a generally upright window is positioned in an aperture in the upper housing portion. An imaging assembly is positioned within the housing and has a first imaging field-of-view (FOV) that is directed toward the horizontal widow and a second imaging FOV that is directed towards the upright window. A first illumination assembly has a first illumination FOV that is directed towards the horizontal window and a second illumination assembly has a second illumination FOV that is directed towards the upright window. No more than 10 percent of a light source of the second illumination assembly is visible within a boundary of the first imaging FOV, no more than 10 percent of optical components associated with the first imaging FOV are within a boundary of the second imaging FOV, an upper edge of the aperture in the upper housing portion is outside a boundary of the first illumination FOV, and the optical components associated with the first imaging FOV and the second illumination assembly are arranged such that light emitted by the second illumination assembly and passing through the horizontal window does not create an artifact on the imaging assembly.

In a variation of this embodiment, the imaging assembly includes an image sensor having a sensor FOV. A first mirror is positioned within the housing and is configured to redirect the first imaging FOV towards the horizontal window and a second mirror is positioned within the housing and configured to redirect the second imaging FOV towards the upright window. A splitter mirror is positioned within the housing and is configured to split the sensor FOV into the first imaging FOV and the second imaging FOV and redirect the second imaging FOV towards the second mirror.

In another variation of this embodiment, the imaging assembly comprises a first image sensor that includes the first imaging FOV that is directed by the first image sensor directly towards the horizontal window and a second image sensor that includes the second imaging FOV that is directed by the second image sensor directly towards the upright window.

In another variation of this embodiment, the imaging assembly comprises a first image sensor including the first imaging FOV and a second image sensor including the second imaging FOV. A first mirror is positioned within the housing and is configured to reflect the first imaging FOV towards the horizontal window and a second mirror positioned within the housing and is configured to reflect the second imaging FOV towards the upright window.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The example bioptic barcode readers disclosed herein simultaneously expose and illuminate the imaging fields-of-view passing through both the upright and horizontal windows of the bioptic barcode reader where the fields-of-view intersect in the product scanning region, rather than alternating illumination between the upright and horizontal window to avoid producing artifacts or hotspots at the image sensors. Illuminating and exposing the fields-of-view through the horizontal and vertical windows simultaneous improves swipe performance by effectively doubling the number of image frames captured through each window during a swipe event, compared to alternating the illumination and exposure through each window. In addition, users also tend to rotate objects slightly as they pass the objects through the fields-of-view and the extra frames captured from each window might also capture a greater diversity of angles of the object, which can reduce the chances of specular obscuration of the barcode. The configurations disclosed herein could be used with a single imager split between the two windows or with a dedicated imager for each window. By removing the possibility of a line-of-sight viewing (directly or off mirrors) between an imaging field-of-view and the alternate illumination system, the imaging assembly is prevented from being blinded by the illumination system it isn't associated with.

Figure 1:
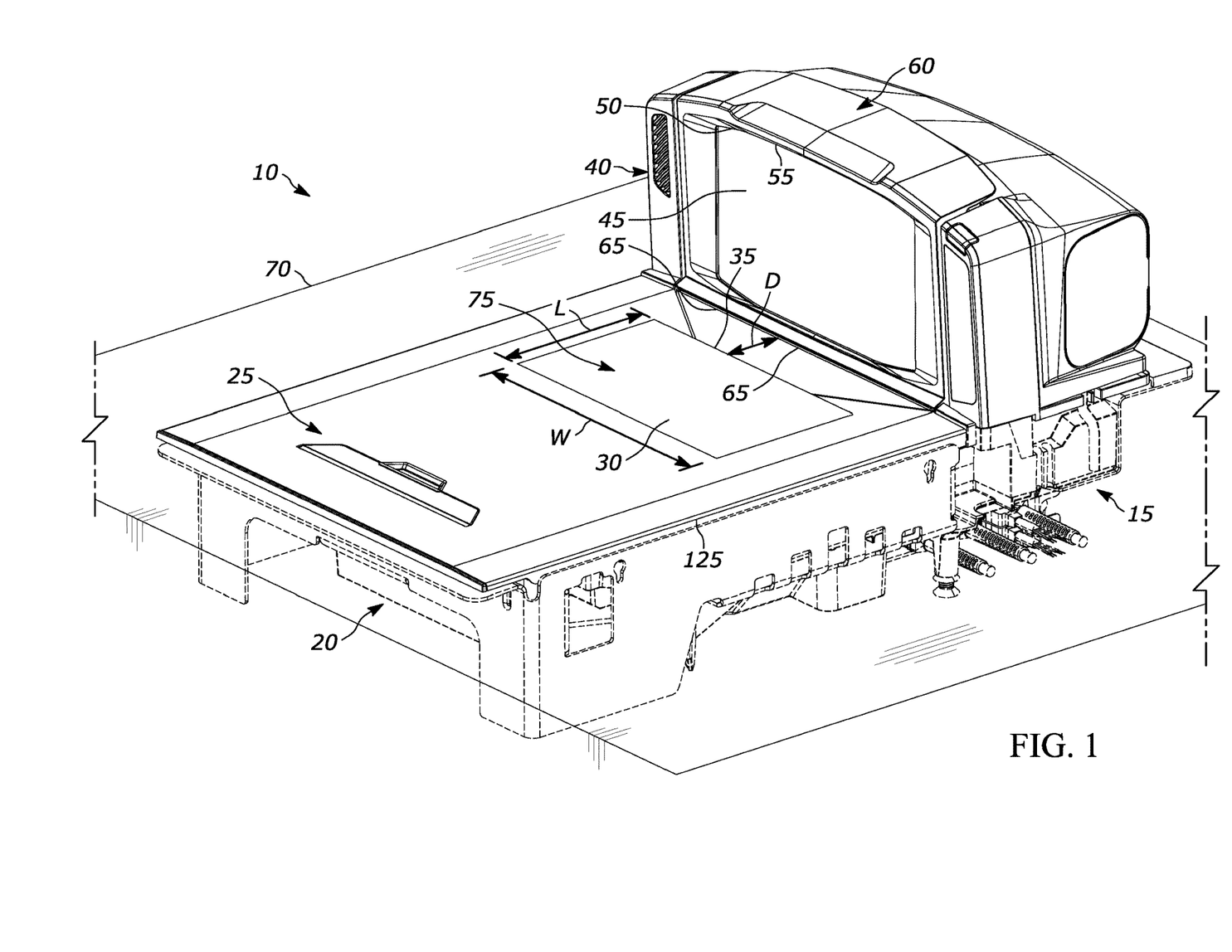
FIG. 1 illustrates a front perspective view of an example bioptic barcode reader.

Referring to FIG. 1, an example bioptic barcode reader 10, such as the Zebra® MP7200 bioptic barcode reader, is shown and can be configured to be supported by a workstation 70, such as a checkout counter at a POS of a retail store. Bioptic barcode reader 10 has a housing 15 that includes a lower housing portion 20 and an upper housing portion 40 that extends above lower housing portion 20. A generally horizontal window 30 is positioned at an upper surface 25 of lower housing portion 20, which faces a product scanning region 75, to allow a first set of optical components positioned within housing 15 to direct at least one field-of-view through horizontal window 30. Preferably, a width W of horizontal window 30 is greater than a length L of horizontal window 30 and an inner edge 35 of horizontal window 30 is horizontally spaced from a front edge of upper housing portion 40 by a distance D that is greater than or equal to 2 inches and less than or equal to 3 inches. Upper housing portion 40 includes a generally upright window 45, which is positioned in an aperture 50 in upper housing portion 40, to allow a second set of optical components positioned within housing 15 to direct at least one FOV through upright window 45. The fields-of-view directed through horizontal window 30 and upright window 45 intersect to define product scanning region 75, where an object 80 can be scanned for sale at the POS. Having width W of horizontal window 30 greater than length L allows for a wider field-of-view through horizontal window 30 from left to right, or side to side, and increases the amount of time an object is passing through the field-of-view when swiped. The wider horizontal window 30 also allows for a wider angle at the left and right sides of the field-of-view through horizontal window 30, which can assist in capturing barcodes on the sides of objects as they are being swiped. In addition, when users are swiping an object through product scanning region 75 and over horizontal window 30, users don't tend to swipe the object too close to upper housing portion 40, because doing so may hit upper housing portion 40 and slow down scanning and potentially scratch the upright window 45 or damage upper housing portion 40. Therefore, spacing horizontal window 30 away from upper housing portion 40 increases the likelihood that the part of the object with the barcode is within the field-of-view through horizontal window 30, when it is on that respective side.

Figure 2:
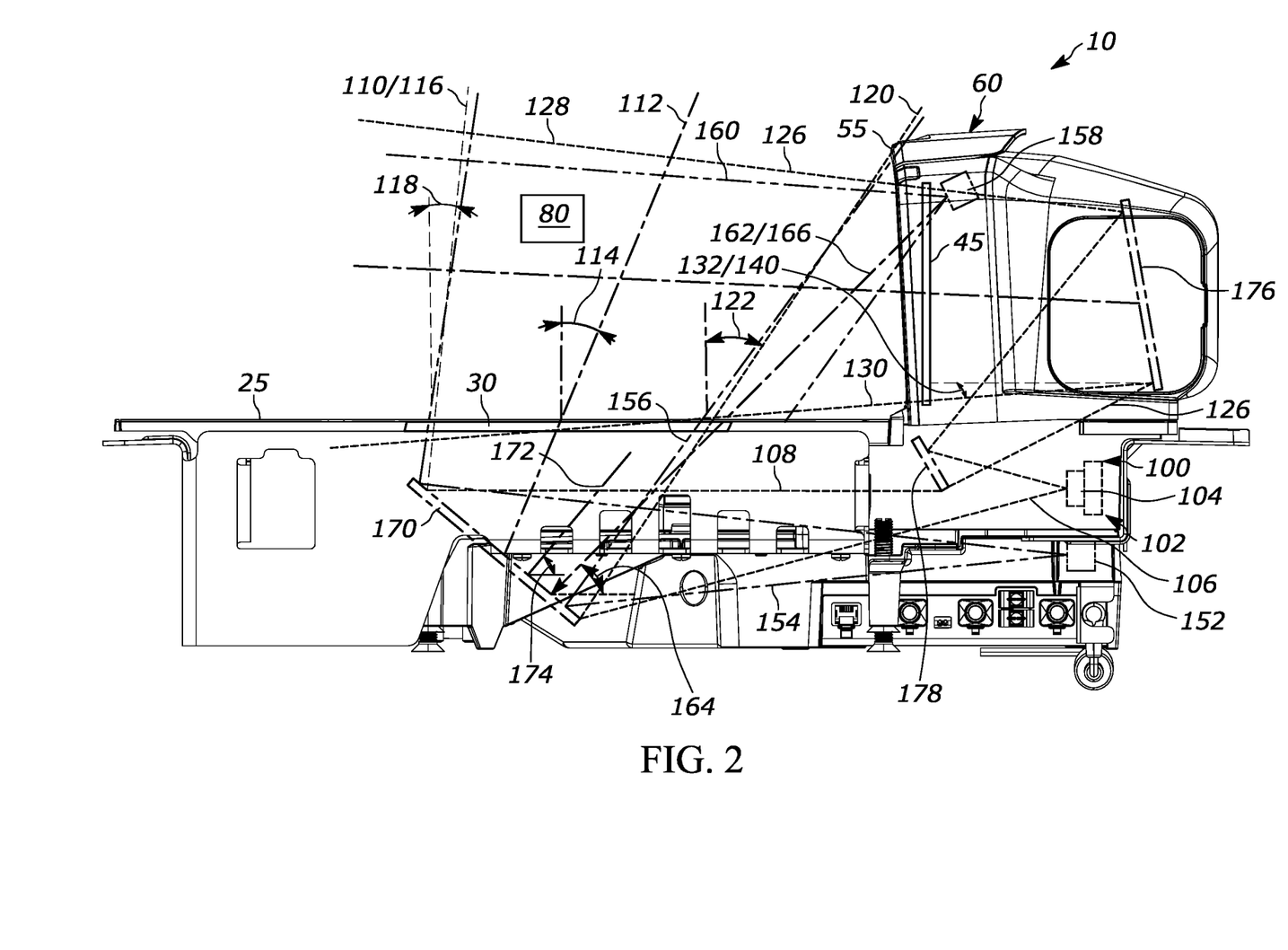
FIG. 2 illustrates a side view of the bioptic barcode reader of FIG. 1 with a first example arrangement of optical components.

Referring to FIG. 2, bioptic barcode reader 10 is shown with a first example optical assembly 100, which generally includes an imaging assembly 102, a splitter mirror 178, a first mirror 170, a second mirror 176, a first illumination assembly 152, and a second illumination assembly 158.

Imaging assembly 102 is positioned within housing 15 and includes an image sensor 104 that has a sensor FOV 106. Splitter mirror 178 is positioned within housing 15 and is positioned and oriented to split sensor FOV 106 into a first imaging FOV 108, which is directed toward horizontal window 30, and a second imaging FOV 126, which is directed towards upright window 45. Second imaging FOV 126 is redirected by splitter mirror 178 towards second mirror 176, which is positioned in upper housing portion 40 of housing 15. In the particular example shown, first mirror 170 is positioned within lower housing portion 20 of housing 15 and first imaging FOV 108 is reflected and redirected by first mirror 170 towards horizontal window 30 and second imaging FOV 126 is reflected and redirected by second mirror 176 towards upright window 45. However, as is shown in other examples herein and described below, first imaging FOV 108 can be directed toward horizontal window 30 and second imaging FOV 126 can be directed toward upright window 45 through reflection off of or redirection by any number of mirrors or can be directed toward the respective windows directly from the imaging assembly.

Preferably, a first central axis 112 of first imaging FOV 108 that is directed by first mirror 170 towards horizontal window 30 is tilted toward upper housing portion 40 at a first angle 114 from vertical that is greater than zero. As used herein, the term vertical means perpendicular to upper surface 25 and horizontal window 30 and the term horizontal means parallel to upper surface 25 and horizontal window 30. Tilting first imaging FOV 108 in this manner provides coverage of product scanning region 75 by first imaging FOV 108 and also provides first imaging FOV 108 the ability to capture images of a back side (side facing a user and away from upper housing portion 40) of an object that is within product scanning region 75. With first central axis 112 tilted toward upper housing portion 40, preferably first imaging FOV 108 that is directed towards horizontal window 30 is wide enough so that an outer edge 116 (edge closest to a user) of first imaging FOV 108 forms a second angle 118 from vertical that is greater than or equal to zero degrees and less than or equal to 10 degrees towards upper housing portion 40 and an inner edge 120 (edge closest to upper housing portion 40) of first imaging FOV 108 forms a third angle 122 from vertical that is greater than or equal to 20 degrees and less than or equal to 25 degrees towards upper housing portion 40. In addition, a bottom edge 130 of second imaging FOV 126 that is directed towards upright window 45 preferably forms a fourth angle 132 below horizontal that is greater than or equal to zero degrees and less than or equal to 25 degrees, which ensures that second imaging FOV 126 has sufficient coverage of product scanning region 75 and does not have any blind spots in areas very close to upper surface 25 and horizontal window 30.

First illumination assembly 152 is positioned in lower housing portion 20 of housing 15 and has a first illumination FOV 154 that is directed towards horizontal window 30. In the particular example shown, first illumination FOV 154 is directed from first illumination assembly 152 towards first mirror 170 and first mirror 170 reflects and redirects first illumination FOV 154 towards horizontal window 30. Preferably, imaging assembly 102, first illumination assembly 152, and first mirror 170 are positioned and oriented so that first illumination FOV 154 that is directed towards horizontal window 30 overlaps with first imaging FOV 108 that is directed towards horizontal window 30 by at least 80% in the area between horizontal window 30 and a top 54 of upper housing portion 40. This level of illumination coverage of first imaging FOV 108 by first illumination FOV 154 ensures sufficient illumination of objects within first imaging FOV 108 that are brought within product scanning region 75.

Second illumination assembly 158 is positioned in upper housing portion 40 of housing 15 and has a second illumination FOV 160 that is directed towards upright window 45. In the example shown, second illumination assembly 158 directs second illumination FOV 160 directly through upright window 45. However, second illumination assembly 158 could be positioned in other locations within housing 15 and second illumination FOV 160 could be directed towards second mirror 176 and reflected and redirected by second mirror 176 towards upright window 45.

Imaging assembly 102, first mirror 170, and second illumination assembly 158 are positioned and oriented such that no more than 10 percent of a light source of second illumination assembly 158 is visible within a boundary 110 of first imaging FOV 108. Preferably, second illumination assembly 158 is outside boundary 110 of first illumination FOV 154 and none of second illumination assembly 158 is visible within boundary 110. With this configuration, second illumination assembly 158 will not be seen by imaging assembly 102 and illumination of second illumination assembly 158 will not create an artifact on image sensor 104 of imaging assembly 102.

Imaging assembly 102, first mirror 170, and second mirror 176 are positioned and oriented such that no more than 10 percent of first mirror 170, and any other optical components (e.g., mirrors, lenses, etc.) associated with first imaging FOV 108, are visible within a boundary 128 of second imaging FOV 126. Preferably, first mirror 170, and any other optical components associated with first imaging FOV 108, are outside of boundary 128 of second imaging FOV 126 and none of first mirror 170 is within boundary 128. With this configuration, illumination from first illumination assembly 152 that is reflected and redirected by first mirror 170 out of horizontal window 30 will not be visible within second imaging FOV 126 and will not create an artifact on image sensor 104 of imaging assembly 102.

Imaging assembly 102 and first mirror 170 are positioned and oriented such that an upper edge 55 of aperture 50 in upper housing portion 40 is outside a boundary 156 of first illumination FOV 154. With this configuration, second illumination assembly 158 will not be seen by imaging assembly 102 and illumination of second illumination assembly 158 will not create an artifact on image sensor 104 of imaging assembly 102.

The optical components (e.g., first mirror 170) associated with first imaging FOV 108 and second illumination assembly 158 are arranged such that light 166 emitted by second illumination assembly 158 and passing through horizontal window 30 does not create an artifact on image sensor 104 of imaging assembly 102. For example, all or substantially all light rays 162 (as used herein, all or substantially all of the light rays is defined at least 98% or higher of the light rays) from second illumination assembly 158 that pass through horizontal window 30, and are not reflected within horizontal window 30 or off of an object, preferably each form respective angles 164 relative to horizontal that are equal to or less than a second angle 174 that is formed between a normal line 172 and horizontal. As used herein, a normal line of the first mirror is a line normal, or perpendicular to, a reflective surface of the first mirror. With this configuration, light rays 162 reflected and redirected by first mirror 170 are prevented from being directed in a direction that they would be sensed or create an artifact on image sensor 104 of imaging assembly 102.

Figure 3:
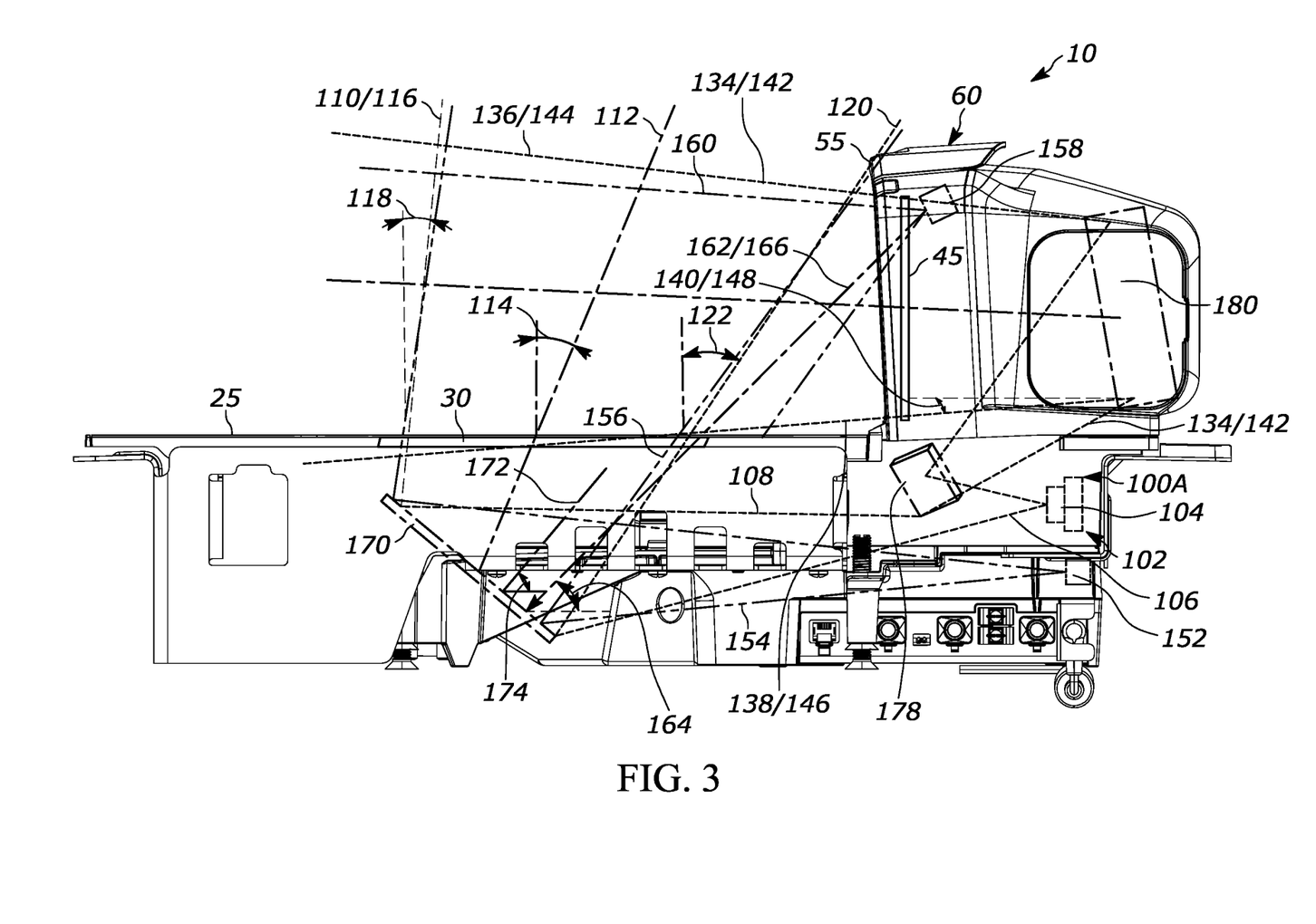
FIG. 3 illustrates a side view of the bioptic barcode reader of FIG. 1 with a second example arrangement of optical components.
Figure 4:
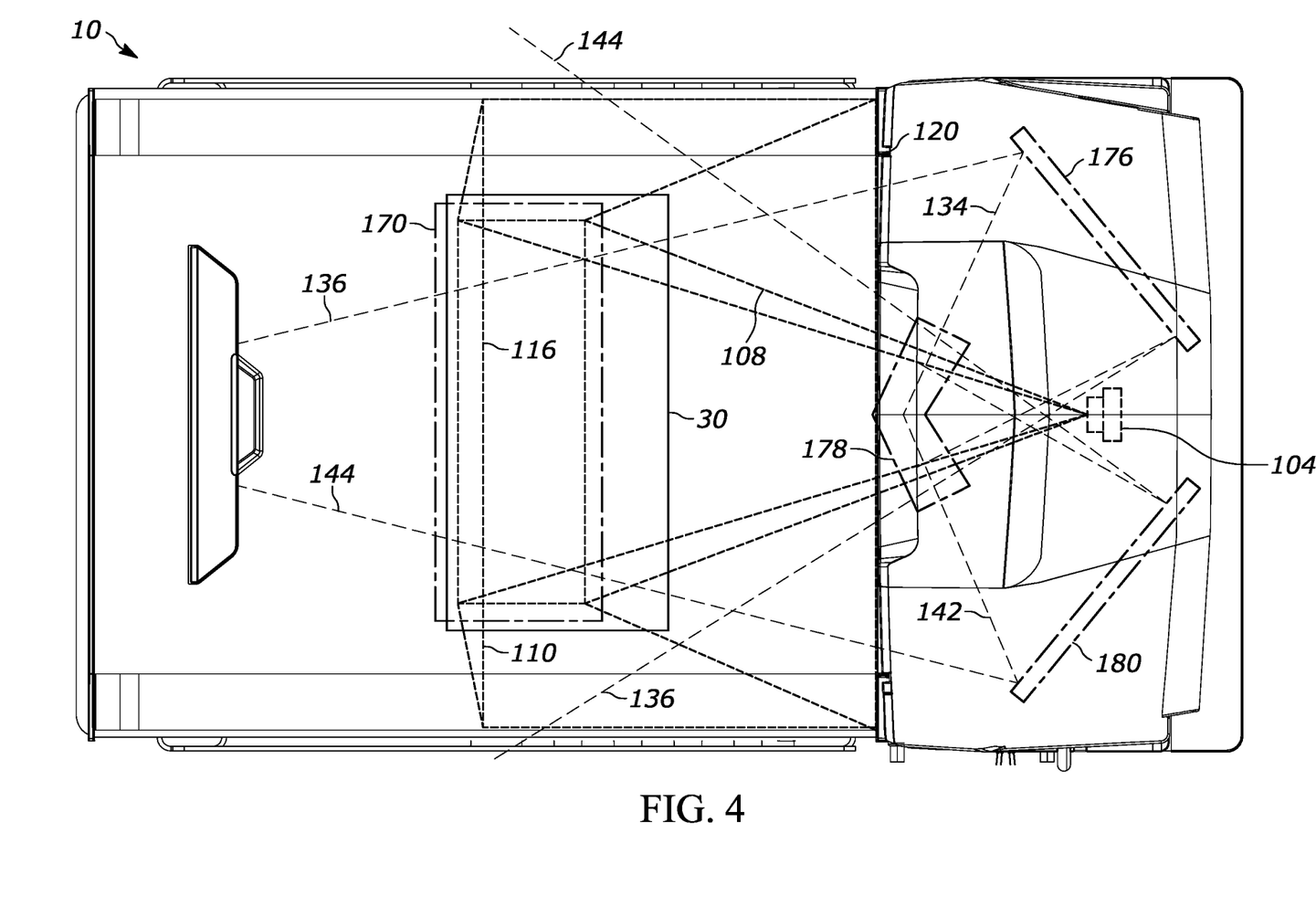
FIG. 4 illustrates a top view of the bioptic barcode reader of FIG. 3.

Referring to FIGS. 3-4, bioptic barcode reader 10 is shown with a second example optical assembly 100A, which is the same as optical assembly 100, except that splitter mirror 178 is a concave or convex splitter mirror that not only splits sensor FOV 106 into first imaging FOV 108 and second imaging FOV 126, but also splits second imaging FOV 126 into a third imaging FOV 134 and a fourth imaging FOV 142. Splitter mirror 178 is configured to direct third imaging FOV 134 towards second mirror 176, which reflects and redirects third imaging FOV 134 towards upright window 45, and to direct fourth imaging FOV 142 towards a third mirror 180 in upper housing portion 40, which reflects and redirects fourth imaging FOV 142 towards upright window 45.

Similar to second imaging FOV 126 directed towards upright window 45, in the example shown in FIGS. 3-4, no more than 10 percent of first mirror 170 is within a boundary 136 of third imaging FOV 134 directed toward upright window 45 by second mirror 176 or within a boundary 144 of fourth imaging FOV 142 directed towards upright window 45 by third mirror 180. Preferably, first mirror 170 is not at all within, is outside, boundary 136 of third imaging FOV 134 and/or is not at all within, is outside, boundary 144 of fourth imaging FOV 142. In addition, similar to second imaging FOV 126 directed toward upright window 45, a bottom edge 138 of third imaging FOV 134 directed towards upright window 45 forms a fifth angle 140 below horizontal that is greater than or equal to zero degrees and less than or equal to 25 degrees and/or a bottom edge 146 of fourth imaging FOV 142 directed towards upright window 45 forms a sixth angle 148 below horizontal that is greater than or equal to zero degrees and less than or equal to 25 degrees.

Figure 5:
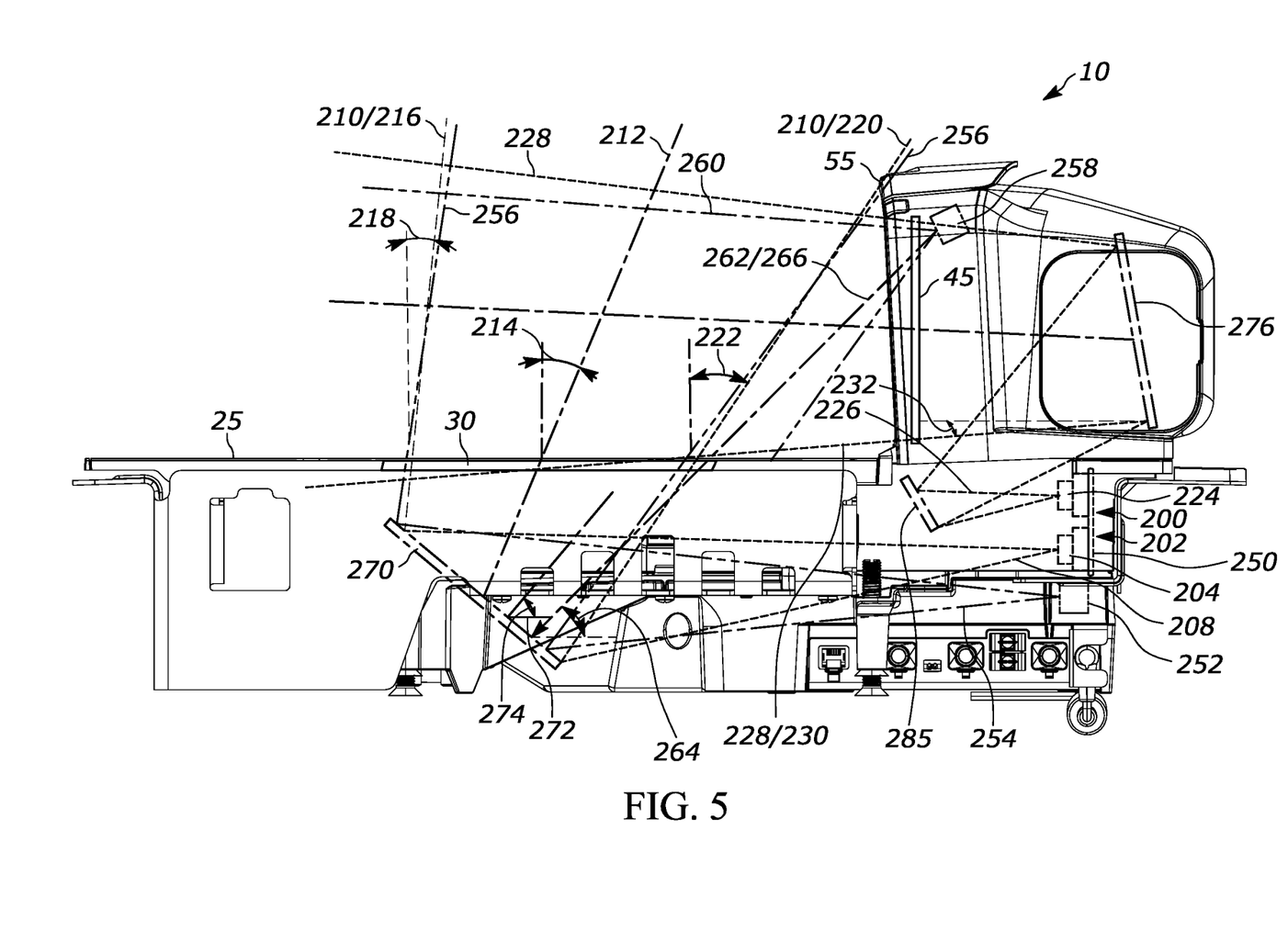
FIG. 5 illustrates a side view of the bioptic barcode reader of FIG. 1 with a third example arrangement of optical components.

Referring to FIG. 5, bioptic barcode reader 10 is shown with a third example optical assembly 200, which generally includes an imaging assembly 202, a first mirror 270, a second mirror 276, a first illumination assembly 252, and a second illumination assembly 258.

Imaging assembly 202 is positioned within housing 15 and includes a first image sensor 204, having a first imaging FOV 208 directed towards horizontal window 30, and a second image sensor 224, having a second imaging FOV 226 directed towards upright window 45. In the particular example shown, first image sensor 204 and second image sensor 224 are both mounted on a common printed circuit board 250. In the particular example shown, first mirror 270 is positioned within lower housing portion 20 of housing 15 and first imaging FOV 108 is reflected and redirected by first mirror 170 towards horizontal window 30. A fourth mirror 285 is positioned within housing 15 and reflects and redirects second imaging FOV 226 towards second mirror 275, which is positioned in upper housing portion 40 of housing 15, and second imaging FOV 226 is reflected and redirected by second mirror 276 towards upright window 45. However, as is shown and described in other examples herein, first imaging FOV 208 can be directed toward horizontal window 30 and second imaging FOV 226 can be directed toward upright window 45 through reflection off of or redirection by any number of mirrors or can be directed toward the respective windows directly from the imaging assembly.

Preferably, a first central axis 212 of first imaging FOV 208 that is directed by first mirror 270 towards horizontal window 30 is tilted toward upper housing portion 40 at a first angle 214 from vertical that is greater than zero. Tilting first imaging FOV 208 in this manner provides coverage of product scanning region 75 by first imaging FOV 208 and also provides first imaging FOV 208 the ability to capture images of a back side (side facing a user and away from upper housing portion 40) of an object that is within product scanning region 75. With first central axis 212 tilted toward upper housing portion 40, preferably first imaging FOV 208 that is directed towards horizontal window 30 is wide enough so that an outer edge 216 (edge closest to a user) of first imaging FOV 208 forms a second angle 218 from vertical that is greater than or equal to zero degrees and less than or equal to 10 degrees towards upper housing portion 40 and an inner edge 220 (edge closest to upper housing portion 40) of first imaging FOV 208 forms a third angle 222 from vertical that is greater than or equal to 20 degrees and less than or equal to 25 degrees towards upper housing portion 40. In addition, a bottom edge 230 of second imaging FOV 226 that is directed towards upright window 45 preferably forms a fourth angle 232 below horizontal that is greater than or equal to zero degrees and less than or equal to 25 degrees, which ensures that second imaging FOV 226 has sufficient coverage of product scanning region 75 and does not have any blind spots in areas very close to upper surface 25 and horizontal window 30.

First illumination assembly 252 is positioned in lower housing portion 20 of housing 15 and has a first illumination FOV 254 that is directed towards horizontal window 30. In the particular example shown, first illumination FOV 254 is directed from first illumination assembly 252 towards first mirror 270 and first mirror 270 reflects and redirects first illumination FOV 254 towards horizontal window 30. Preferably, first image sensor 204, first illumination assembly 252, and first mirror 270 are positioned and oriented so that first illumination FOV 254 that is directed towards horizontal window 30 overlaps with first imaging FOV 208 that is directed towards horizontal window 30 by at least 80% in the area between horizontal window 30 and a top 54 of upper housing portion 40. This level of illumination coverage of first imaging FOV 208 by first illumination FOV 254 ensures sufficient illumination of objects within first imaging FOV 208 that are brought within product scanning region 75.

Second illumination assembly 258 is positioned in upper housing portion 40 of housing 15 and has a second illumination FOV 260 that is directed towards upright window 45. In the example shown, second illumination assembly 258 directs second illumination FOV 260 directly through upright window 45. However, second illumination assembly 258 could be positioned in other locations within housing 15 and second illumination FOV 260 could be directed towards second mirror 276 and reflected and redirected by second mirror 276 towards upright window 45.

First image sensor 204 of imaging assembly 202, first mirror 270, and second illumination assembly 258 are positioned and oriented such that no more than 10 percent of a light source of second illumination assembly 258 is visible within a boundary 210 of first imaging FOV 208. Preferably, second illumination assembly 258 is outside boundary 210 of first illumination FOV 254 and none of second illumination assembly 258 is visible within boundary 210. With this configuration, second illumination assembly 258 will not be seen by first image sensor 204 of imaging assembly 202 and illumination of second illumination assembly 258 will not create an artifact on first image sensor 204.

Second image sensor 224 of imaging assembly 202, first mirror 270, and second mirror 276 are positioned and oriented such that no more than 10 percent of first mirror 270, and any other optical components (e.g., mirrors, lenses, etc.) associated with first imaging FOV 208, are visible within a boundary 228 of second imaging FOV 226. Preferably, first mirror 270, and any other optical components associated with first imaging FOV 208, are outside of boundary 228 of second imaging FOV 226 and none of first mirror 270 is within boundary 228. With this configuration, illumination from first illumination assembly 252 that is reflected and redirected by first mirror 270 out of horizontal window 30 will not be visible within second imaging FOV 226 and will not create an artifact on second image sensor 224 of imaging assembly 202.

First image sensor 204 of imaging assembly 202 and first mirror 270 are positioned and oriented such that an upper edge 55 of aperture 50 in upper housing portion 40 is outside a boundary 256 of first illumination FOV 254. With this configuration, second illumination assembly 258 will not be seen by first image sensor 204 of imaging assembly 202 and illumination of second illumination assembly 258 will not create an artifact on first image sensor 204 of imaging assembly 202.

The optical components (e.g., first mirror 270) associated with first imaging FOV 208 and second illumination assembly 258 are arranged such that light 266 emitted by second illumination assembly 258 and passing through horizontal window 30 does not create an artifact on first image sensor 204 of imaging assembly 202. For example, all or substantially all light rays 262 from second illumination assembly 258 that pass through horizontal window 30, and are not reflected within horizontal window 30 or off of an object, preferably each form respective angles 264 relative to horizontal that are equal to or less than a second angle 274 that is formed between a normal line 272 and horizontal. With this configuration, light rays 262 reflected and redirected by first mirror 270 are prevented from being directed in a direction that they would be sensed or create an artifact on first image sensor 204 of imaging assembly 202.

Figure 6:
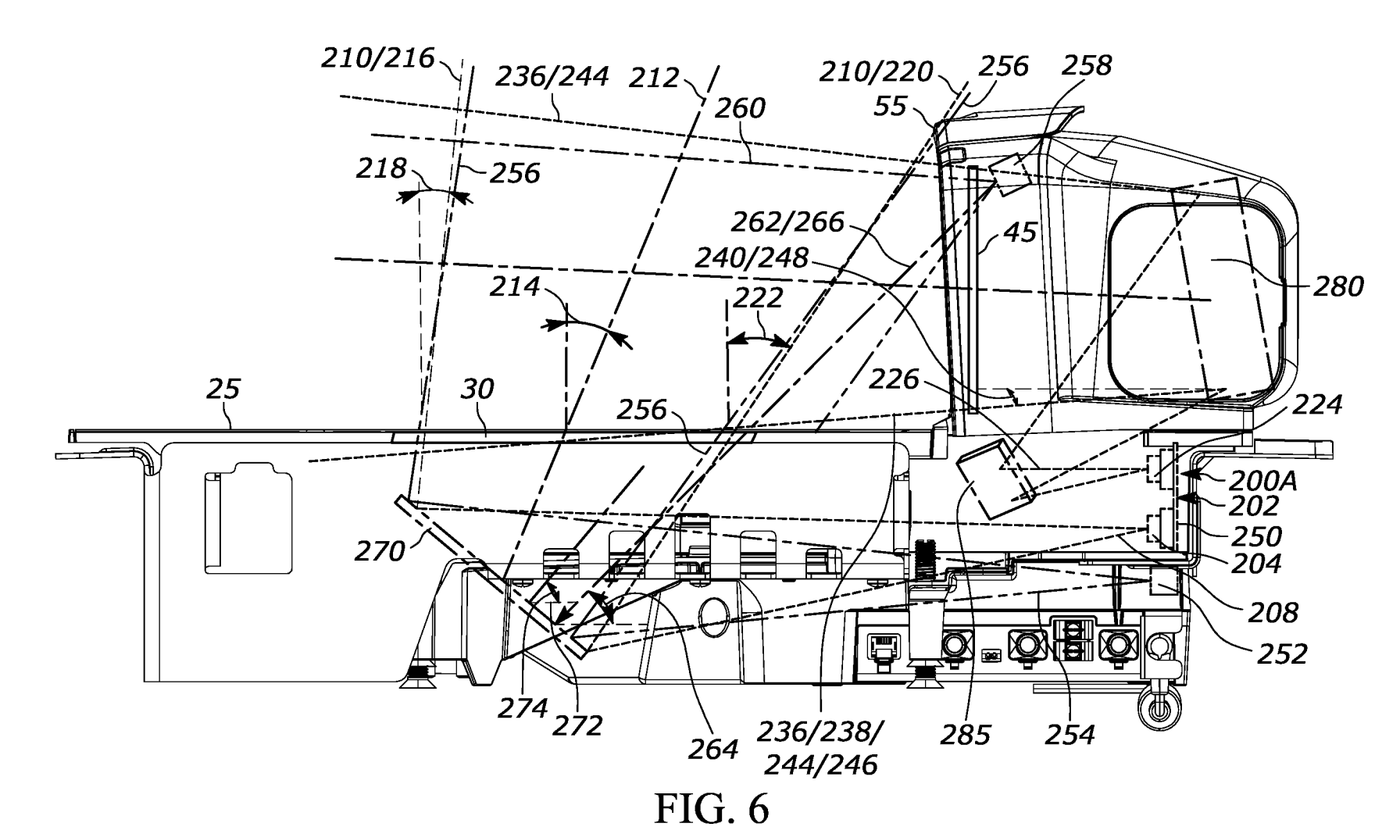
FIG. 6 illustrates a side view of the bioptic barcode reader of FIG. 1 with a fourth example arrangement of optical components.
Figure 7:
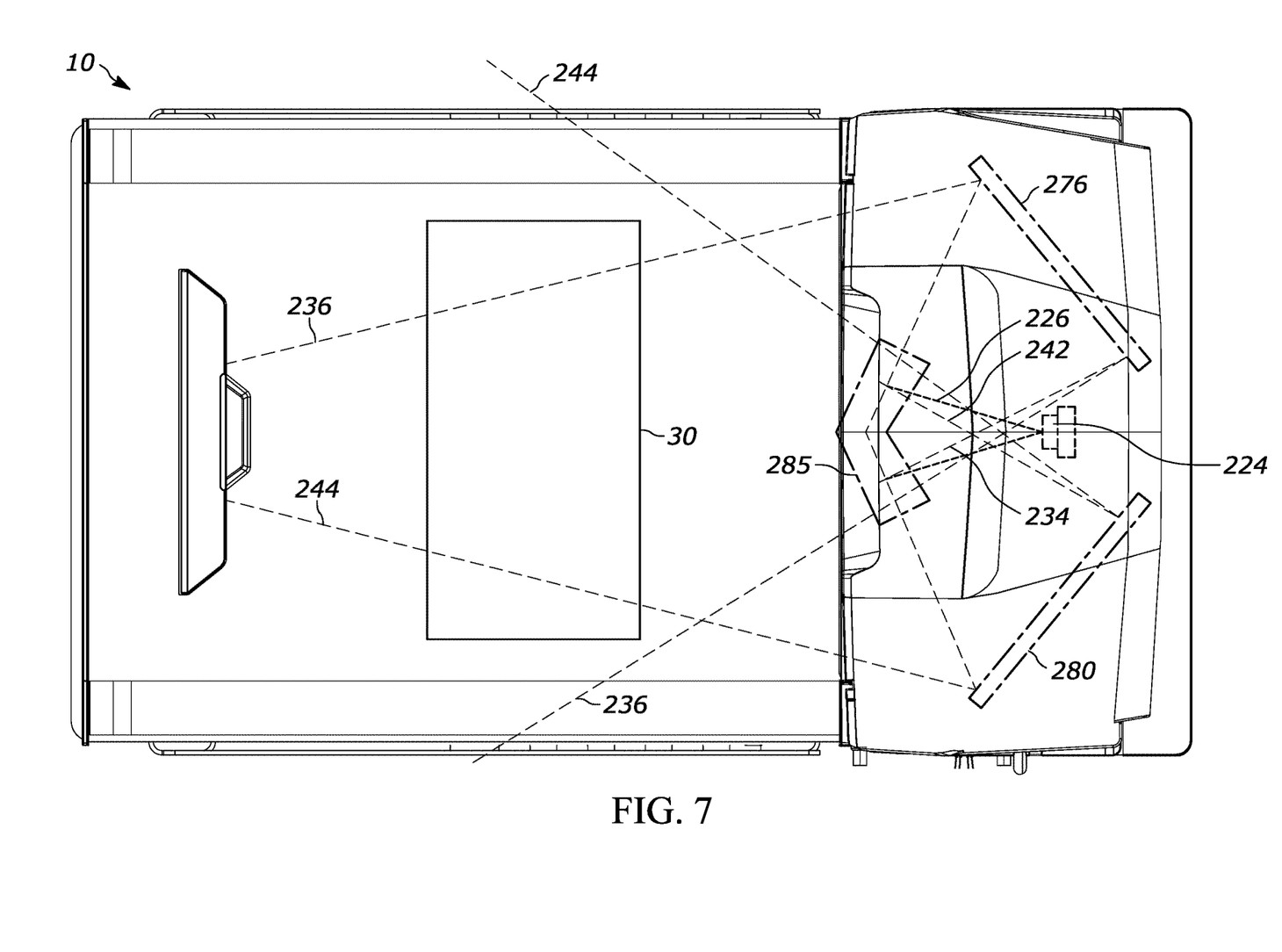
FIG. 7 illustrates a top view of the bioptic barcode reader of FIG. 6.

Referring to FIGS. 6-7, bioptic barcode reader 10 is shown with a fourth example optical assembly 200A, which is the same as optical assembly 200, except that fourth mirror 285 is a concave or convex splitter mirror that splits second imaging FOV 226 into a third imaging FOV 234 and a fourth imaging FOV 242. Fourth mirror (splitter mirror) 285 is configured to direct third imaging FOV 234 towards second mirror 276, which reflects and redirects third imaging FOV 234 towards upright window 45, and to direct fourth imaging FOV 242 towards a third mirror 280 in upper housing portion 40, which reflects and redirects fourth imaging FOV 242 towards upright window 45.

Similar to second imaging FOV 226 directed towards upright window 45, in the example shown in FIGS. 6-7, no more than 10 percent of first mirror 270 is within a boundary 236 of third imaging FOV 234 directed toward upright window 45 by second mirror 276 or within a boundary 244 of fourth imaging FOV 242 directed towards upright window 45 by third mirror 280. Preferably, first mirror 170 is not at all within, is outside, boundary 236 of third imaging FOV 234 and/or is not at all within, is outside, boundary 244 of fourth imaging FOV 242. In addition, similar to second imaging FOV 226 directed toward upright window 45, a bottom edge 238 of third imaging FOV 234 directed towards upright window 45 forms a fifth angle 240 below horizontal that is greater than or equal to zero degrees and less than or equal to 25 degrees and/or a bottom edge 246 of fourth imaging FOV 242 directed towards upright window 45 forms a sixth angle 248 below horizontal that is greater than or equal to zero degrees and less than or equal to 25 degrees.

Figure 8:
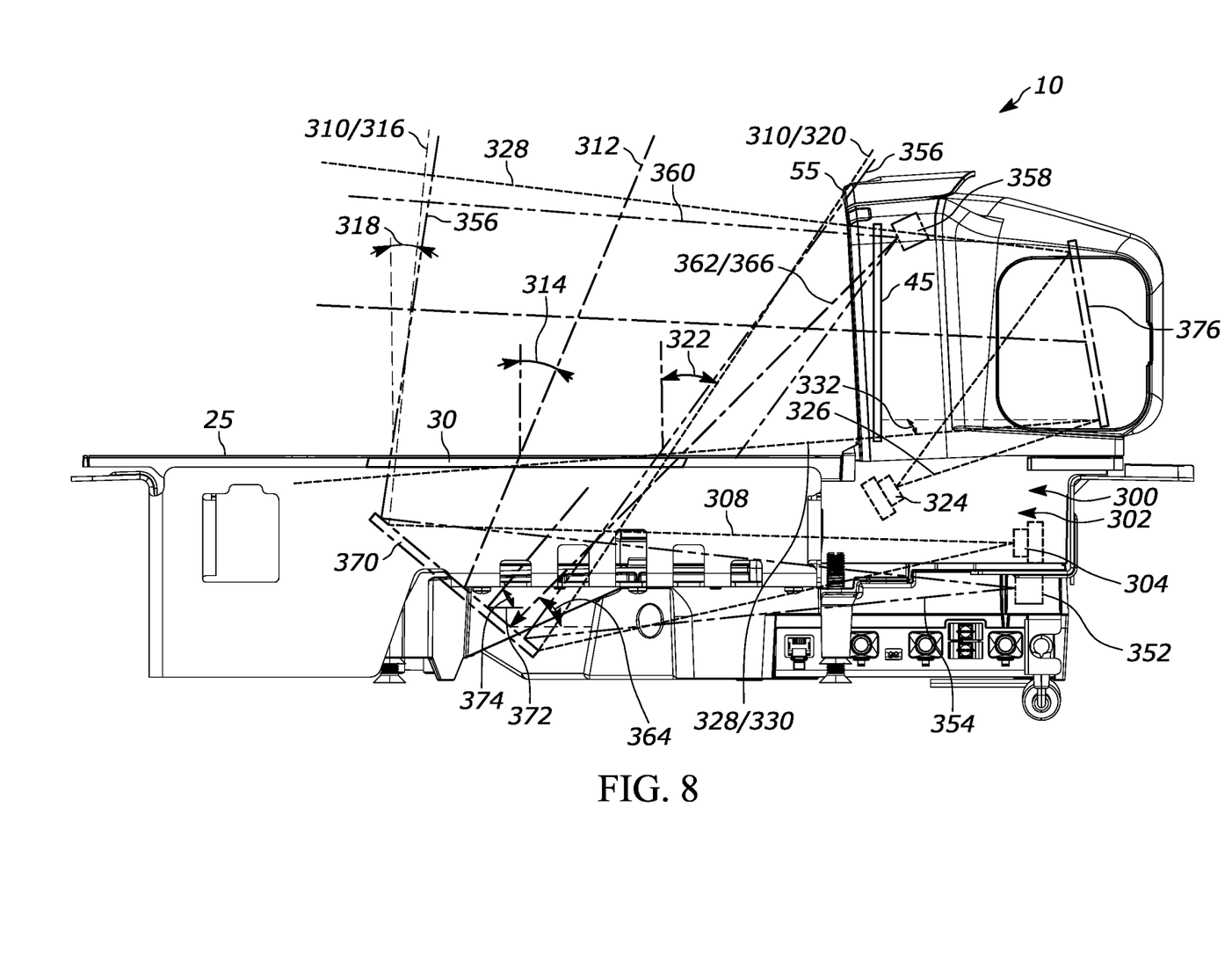
FIG. 8 illustrates a side view of the bioptic barcode reader of FIG. 1 with a fifth example arrangement of optical components.

Referring to FIG. 8, bioptic barcode reader 10 is shown with a fifth example optical assembly 300, which generally includes an imaging assembly 302, a first mirror 370, a second mirror 376, a first illumination assembly 352, and a second illumination assembly 358.

Imaging assembly 302 is positioned within housing 15 and includes a first image sensor 304, having a first imaging FOV 308 directed towards horizontal window 30, and a second image sensor 324, having a second imaging FOV 326 directed towards upright window 45. In the particular example shown, first mirror 370 is positioned within lower housing portion 20 of housing 15 and first imaging FOV 308 is reflected and redirected by first mirror 370 towards horizontal window 30. In addition, second imaging FOV 326 is reflected and redirected by second mirror 376 towards upright window 45. However, as is shown and described in other examples herein, first imaging FOV 308 can be directed toward horizontal window 30 and second imaging FOV 326 can be directed toward upright window 45 through reflection off of or redirection by any number of mirrors or can be directed toward the respective windows directly from the imaging assembly.

Preferably, a first central axis 312 of first imaging FOV 308 that is directed by first mirror 370 towards horizontal window 30 is tilted toward upper housing portion 40 at a first angle 314 from vertical that is greater than zero. Tilting first imaging FOV 308 in this manner provides coverage of product scanning region 75 by first imaging FOV 308 and also provides first imaging FOV 308 the ability to capture images of a back side (side facing a user and away from upper housing portion 40) of an object that is within product scanning region 75. With first central axis 312 tilted toward upper housing portion 40, preferably first imaging FOV 308 that is directed towards horizontal window 30 is wide enough so that an outer edge 316 (edge closest to a user) of first imaging FOV 308 forms a second angle 318 from vertical that is greater than or equal to zero degrees and less than or equal to 10 degrees towards upper housing portion 40 and an inner edge 320 (edge closest to upper housing portion 40) of first imaging FOV 308 forms a third angle 322 from vertical that is greater than or equal to 20 degrees and less than or equal to 25 degrees towards upper housing portion 40. In addition, a bottom edge 330 of second imaging FOV 326 that is directed towards upright window 45 preferably forms a fourth angle 332 below horizontal that is greater than or equal to zero degrees and less than or equal to 25 degrees, which ensures that second imaging FOV 326 has sufficient coverage of product scanning region 75 and does not have any blind spots in areas very close to upper surface 25 and horizontal window 30.

First illumination assembly 352 is positioned in lower housing portion 20 of housing 15 and has a first illumination FOV 354 that is directed towards horizontal window 30. In the particular example shown, first illumination FOV 354 is directed from first illumination assembly 352 towards first mirror 370 and first mirror 370 reflects and redirects first illumination FOV 354 towards horizontal window 30. Preferably, first image sensor 304, first illumination assembly 352, and first mirror 370 are positioned and oriented so that first illumination FOV 354 that is directed towards horizontal window 30 overlaps with first imaging FOV 308 that is directed towards horizontal window 30 by at least 80% in the area between horizontal window 30 and a top 54 of upper housing portion 40. This level of illumination coverage of first imaging FOV 308 by first illumination FOV 354 ensures sufficient illumination of objects within first imaging FOV 308 that are brought within product scanning region 75.

Second illumination assembly 358 is positioned in upper housing portion 40 of housing 15 and has a second illumination FOV 360 that is directed towards upright window 45. In the example shown, second illumination assembly 358 directs second illumination FOV 360 directly through upright window 45. However, second illumination assembly 358 could be positioned in other locations within housing 15 and second illumination FOV 360 could be directed towards second mirror 376 and reflected and redirected by second mirror 376 towards upright window 45.

First image sensor 304 of imaging assembly 302, first mirror 370, and second illumination assembly 358 are positioned and oriented such that no more than 10 percent of a light source of second illumination assembly 358 is visible within a boundary 310 of first imaging FOV 308. Preferably, second illumination assembly 358 is outside boundary 310 of first illumination FOV 354 and none of second illumination assembly 358 is visible within boundary 310. With this configuration, second illumination assembly 358 will not be seen by first image sensor 304 of imaging assembly 302 and illumination of second illumination assembly 358 will not create an artifact on first image sensor 304.

Second image sensor 324 of imaging assembly 302, first mirror 370, and second mirror 376 are positioned and oriented such that no more than 10 percent of first mirror 370, and any other optical components (e.g., mirrors, lenses, etc.) associated with first imaging FOV 308, are visible within a boundary 328 of second imaging FOV 326. Preferably, first mirror 370, and any other optical components associated with first imaging FOV 308, are outside of boundary 328 of second imaging FOV 326 and none of first mirror 370 is within boundary 328. With this configuration, illumination from first illumination assembly 352 that is reflected and redirected by first mirror 370 out of horizontal window 30 will not be visible within second imaging FOV 326 and will not create an artifact on second image sensor 324 of imaging assembly 302.

First image sensor 304 of imaging assembly 302 and first mirror 370 are positioned and oriented such that an upper edge 55 of aperture 50 in upper housing portion 40 is outside a boundary 356 of first illumination FOV 354. With this configuration, second illumination assembly 358 will not be seen by first image sensor 304 of imaging assembly 302 and illumination of second illumination assembly 358 will not create an artifact on first image sensor 304 of imaging assembly 302.

The optical components (e.g., first mirror 370) associated with first imaging FOV 308 and second illumination assembly 358 are arranged such that light 366 emitted by second illumination assembly 358 and passing through horizontal window 30 does not create an artifact on first image sensor 304 of imaging assembly 302. For example, all or substantially all light rays 362 from second illumination assembly 358 that pass through horizontal window 30, and are not reflected within horizontal window 30 or off of an object, preferably each form respective angles 364 relative to horizontal that are equal to or less than a second angle 374 that is formed between a normal line 372 and horizontal. With this configuration, light rays 362 reflected and redirected by first mirror 370 are prevented from being directed in a direction that they would be sensed or create an artifact on first image sensor 304 of imaging assembly 302.

Figure 9:
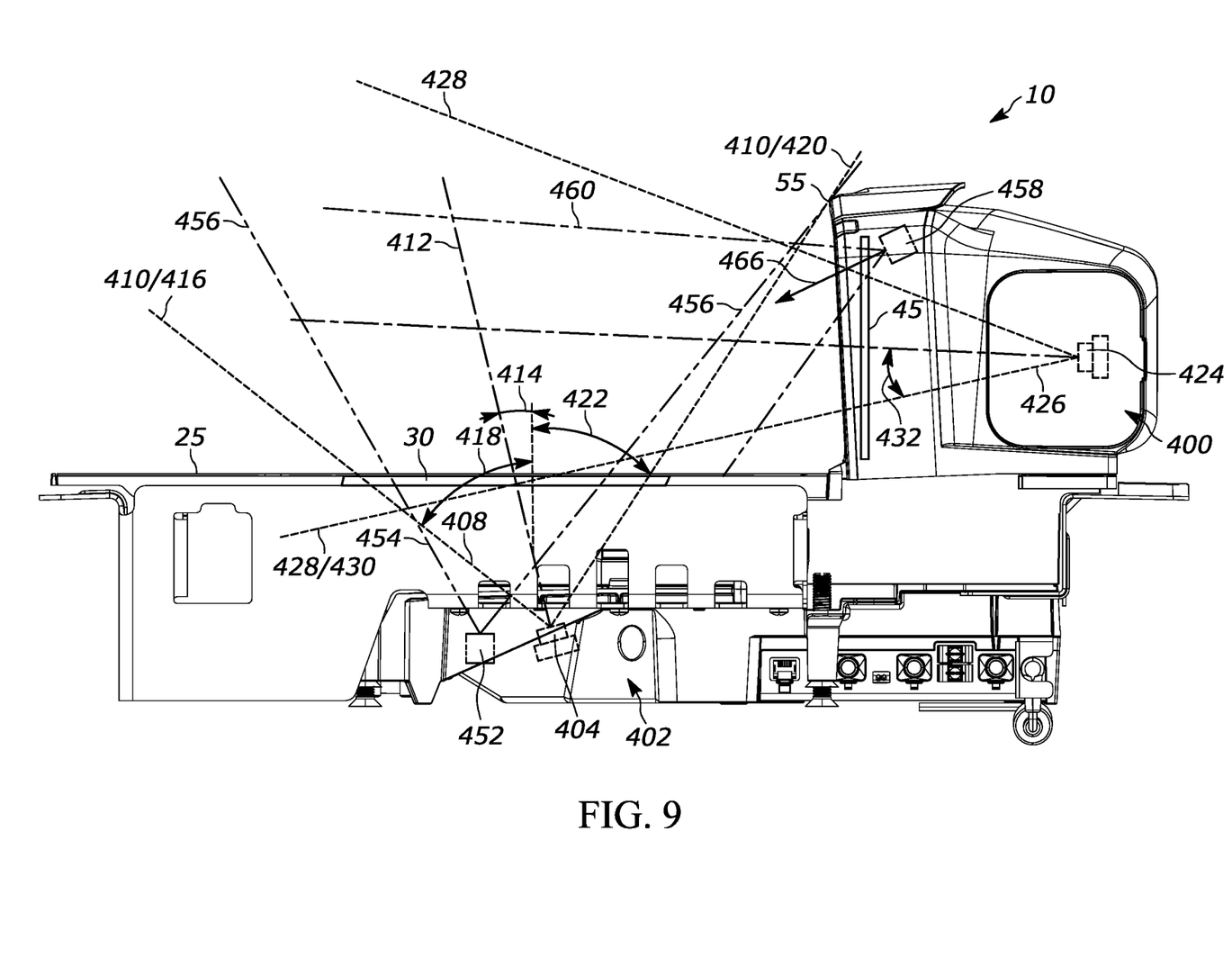
FIG. 9 illustrates a side view of the bioptic barcode reader of FIG. 1 with a sixth example arrangement of optical components.

Referring to FIG. 9, bioptic barcode reader 10 is shown with a sixth example optical assembly 400, which generally includes an imaging assembly 402, a first illumination assembly 452, and a second illumination assembly 458.

Imaging assembly 202 is positioned within housing 15 and includes a first image sensor 404, having a first imaging FOV 408 directed towards horizontal window 30, and a second image sensor 424, having a second imaging FOV 426 directed towards upright window 45. In the particular example shown, first imaging FOV 408 is directed straight out of horizontal window 30 by first image sensor 404 and second imaging FOV 426 is directed straight out of upright window 45 by second image sensor 424. However, as is shown and described in other examples herein, first imaging FOV 408 can be directed toward horizontal window 30 and second imaging FOV 326 can be directed toward upright window 45 through reflection off of or redirection by any number of mirrors.

Preferably, a first central axis 412 of first imaging FOV 408 that is directed toward horizontal window 30 is tilted toward upper housing portion 40 at a first angle 414 from vertical that is greater than zero. Tilting first imaging FOV 408 in this manner provides coverage of product scanning region 75 by first imaging FOV 408 and also provides first imaging FOV 408 the ability to capture images of a back side (side facing a user and away from upper housing portion 40) of an object that is within product scanning region 75. With first central axis 412 tilted toward upper housing portion 40, preferably first imaging FOV 408 that is directed towards horizontal window 30 is wide enough so that an outer edge 416 (edge closest to a user) of first imaging FOV 408 forms a second angle 418 from vertical that is greater than or equal to zero degrees and less than or equal to 10 degrees towards upper housing portion 40 and an inner edge 420 (edge closest to upper housing portion 40) of first imaging FOV 408 forms a third angle 422 from vertical that is greater than or equal to 20 degrees and less than or equal to 25 degrees towards upper housing portion 40. In addition, a bottom edge 430 of second imaging FOV 426 that is directed towards upright window 45 preferably forms a fourth angle 432 below horizontal that is greater than or equal to zero degrees and less than or equal to 25 degrees, which ensures that second imaging FOV 426 has sufficient coverage of product scanning region 75 and does not have any blind spots in areas very close to upper surface 25 and horizontal window 30.

First illumination assembly 452 is positioned in lower housing portion 20 of housing 15 and has a first illumination FOV 454 that is directed towards horizontal window 30. In the particular example shown, first illumination FOV 454 is directed straight towards horizontal window 30 from first illumination assembly 452. Preferably, first image sensor 404 and first illumination assembly 452 are positioned and oriented so that first illumination FOV 454 that is directed towards horizontal window 30 overlaps with first imaging FOV 408 that is directed towards horizontal window 30 by at least 80% in the area between horizontal window 30 and a top 54 of upper housing portion 40. This level of illumination coverage of first imaging FOV 408 by first illumination FOV 454 ensures sufficient illumination of objects within first imaging FOV 408 that are brought within product scanning region 75.

Second illumination assembly 458 is positioned in upper housing portion 40 of housing 15 and has a second illumination FOV 460 that is directed towards upright window 45. In the example shown, second illumination assembly 458 directs second illumination FOV 460 directly through upright window 45.

First image sensor 404 of imaging assembly 402 and second illumination assembly 458 are positioned and oriented such that no more than 10 percent of a light source of second illumination assembly 458 is visible within a boundary 410 of first imaging FOV 408. Preferably, second illumination assembly 458 is outside boundary 410 of first illumination FOV 454 and none of second illumination assembly 458 is visible within boundary 410. With this configuration, second illumination assembly 458 will not be seen by first image sensor 404 of imaging assembly 402 and illumination of second illumination assembly 458 will not create an artifact on first image sensor 404.

Second image sensor 424 of imaging assembly 402 is positioned and oriented such that no more than 10 percent of first illumination assembly 452 is visible within a boundary 428 of second imaging FOV 426. Preferably, first illumination assembly 452 is outside of boundary 428 of second imaging FOV 426 and none of first illumination assembly 452 is within boundary 428. With this configuration, illumination from first illumination assembly 452 that is directed out of horizontal window 30 will not be visible within second imaging FOV 426 and will not create an artifact on second image sensor 424 of imaging assembly 402.

First image sensor 404 of imaging assembly 402 is positioned and oriented such that an upper edge 55 of aperture 50 in upper housing portion 40 is outside a boundary 456 of first imaging FOV 408. With this configuration, second illumination assembly 458 will not be seen by first image sensor 404 of imaging assembly 402 and illumination of second illumination assembly 458 will not create an artifact on first image sensor 404 of imaging assembly 402.

Second illumination assembly 458 and first image sensor 404 are arranged such that light 466 emitted by second illumination assembly 458 and passing through horizontal window 30 does not create an artifact on first image sensor 404 of imaging assembly 402.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A bioptic barcode reader, comprising:
a housing having a lower housing portion with an upper surface facing a product scanning region and an upper housing portion extending above the lower housing portion;
a generally horizontal window positioned at the upper surface of the lower housing portion;
a generally upright window positioned in an aperture in the upper housing portion;
an imaging assembly positioned within the housing, the imaging assembly having a first imaging field-of-view (FOV) that is directed toward the horizontal widow and a second imaging FOV that is directed towards the upright window;
a first mirror positioned within the housing and configured to reflect the first imaging FOV towards the horizontal window;
a first illumination assembly having a first illumination FOV that is directed towards the horizontal window; and
a second illumination assembly having a second illumination FOV that is directed towards the upright window; wherein
no more than 10 percent of a light source of the second illumination assembly is visible within a boundary of the first imaging FOV;
no more than 10 percent of the first mirror is visible within a boundary of the second imaging FOV;
an upper edge of the aperture in the upper housing portion is outside a boundary of the first illumination FOV; and
all or substantially all light rays from the second illumination assembly that pass through the horizontal window, and are not reflected within the horizontal window or off of an object, form respective angles relative to horizontal that are equal to or less than a second angle formed between a normal line of the first mirror and horizontal.

2. The bioptic barcode reader of claim 1, wherein the light source of the second illumination assembly is outside the boundary of the first imaging FOV.

3. The bioptic barcode reader of claim 1, wherein the first mirror is outside the boundary of the second imaging FOV.

4. The bioptic barcode reader of claim 1, wherein a first central axis of the first imaging FOV that is directed towards the horizontal window is tilted toward the upper housing portion at a first angle from vertical that is greater than zero.

5. The bioptic barcode reader of claim 4, wherein: an outer edge of the first imaging FOV that is directed towards the horizontal window forms a second angle from vertical that is greater than or equal to zero degrees and less than or equal to 10 degrees towards the upper housing portion; and an inner edge of the first imaging FOV that is directed towards the horizontal window forms a third angle from vertical that is greater than or equal to 20 degrees and less than or equal to 25 degrees towards the upper housing portion.

6. The bioptic barcode reader of claim 1, wherein the first illumination FOV that is directed towards the horizontal window overlaps with the first imaging FOV that is directed towards the horizontal window by at least 80% between the horizontal window and a top of the upper housing portion.

7. The bioptic barcode reader of claim 1, wherein a bottom edge of the second imaging FOV directed towards the upright window forms a fourth angle below horizontal that is greater than or equal to zero degrees and less than or equal to 25 degrees.

8. The bioptic barcode reader of claim 1, wherein a width of the horizontal window is greater than a length of the horizontal window.

9. The bioptic barcode reader of claim 1, wherein an inner edge of the horizontal window is horizontally spaced from a front edge of the upper housing portion by a distance that is greater than or equal to 2 inches and less than or equal to 3 inches.

10. The bioptic barcode reader of claim 1, wherein the imaging assembly includes an image sensor having a sensor FOV and the bioptic barcode reader comprises:
a second mirror positioned within the housing and configured to redirect the second imaging FOV towards the upright window; and
a splitter mirror positioned within the housing and configured to split the sensor FOV into the first imaging FOV and the second imaging FOV and redirect the second imaging FOV towards the second mirror.

11. The bioptic barcode reader of claim 10, wherein:
the splitter mirror is configured to split the second imaging FOV into a third imaging FOV and a fourth imaging FOV;
the second mirror is configured to redirect the third imaging FOV towards the upright window;
the bioptic barcode reader includes a third mirror positioned within the housing and configured to reflect the fourth imaging FOV towards the upright window; and
no more than 10 percent of the first mirror is visible within a boundary of the third imaging FOV directed towards the upright window and within a boundary of the fourth imaging FOV directed towards the upright window.

12. The bioptic barcode reader of claim 11, wherein the first mirror is not visible within the boundary of the third imaging FOV directed towards the upright window or within the boundary of the fourth imaging FOV directed towards the upright window.

13. The bioptic barcode reader of claim 11, wherein a bottom edge of the third imaging FOV directed towards the upright window forms a fifth angle below horizontal that is greater than or equal to zero degrees and less than or equal to 25 degrees.

14. The bioptic barcode reader of claim 13, wherein a bottom edge of the fourth imaging FOV directed towards the upright window forms a sixth angle below horizontal that is greater than or equal to zero degrees and less than or equal to 25 degrees.

15. The bioptic barcode reader of claim 1, wherein:
the imaging assembly comprises a first image sensor including the first imaging FOV and a second image sensor including the second imaging FOV;
the first mirror is configured to redirect the first imaging FOV towards the horizontal window; and
the bioptic barcode reader comprises a second mirror positioned within the housing and configured to redirect the second imaging FOV towards the upright window.

16. The bioptic barcode reader of claim 15, wherein the first image sensor and the second image sensor are both mounted on a common printed circuit board.

17. The bioptic barcode reader of claim 15, wherein:
the bioptic barcode reader comprises a splitter mirror that is configured to split the second imaging FOV into a third imaging FOV and a fourth imaging FOV, reflect the third imaging FOV towards the second mirror, and reflect the fourth imaging FOV towards a third mirror that is positioned within the housing and configured to reflect the fourth imaging FOV towards the upright window; and
no more than 10 percent of the first mirror is visible within a boundary of the third imaging FOV directed towards the upright window and within a boundary of the fourth imaging FOV directed towards the upright window.

18. The bioptic barcode reader of claim 17, wherein the first mirror is not visible within the boundary of the third imaging FOV directed towards the upright window or within the boundary of the fourth imaging FOV directed towards the upright window.

19. The bioptic barcode reader of claim 17, wherein a bottom edge of the third imaging FOV directed towards the upright window forms a fifth angle below horizontal that is greater than or equal to zero degrees and less than or equal to 25 degrees.

20. The bioptic barcode reader of claim 19, wherein a bottom edge of the fourth imaging FOV directed towards the upright window forms a sixth angle below horizontal that is greater than or equal to zero degrees and less than or equal to 25 degrees.

* * * * *